United States Patent [19]

Krause et al.

[11] Patent Number: 4,683,057
[45] Date of Patent: Jul. 28, 1987

[54] REFILLABLE FILTER-DRIER ASSEMBLY

[75] Inventors: Richard J. Krause, Addison; Zbigniew H. Gugala, Elmhurst; Madhukant A. Shah, Wheaton, all of Ill.

[73] Assignee: Henry Valve Company, Melrose Park, Ill.

[21] Appl. No.: 710,010

[22] Filed: Mar. 8, 1985

[51] Int. Cl.⁴ ............................................. B01D 25/02
[52] U.S. Cl. ................................. 210/232; 210/282; 210/315; 210/323.2; 210/342; 210/452; 210/455
[58] Field of Search ............... 210/232, 238, 314, 315, 210/316, 318, 323.2, 342, 438, 452, 455

[56] References Cited

U.S. PATENT DOCUMENTS

| | | | |
|---|---|---|---|
| 2,017,350 | 10/1935 | Morgan | 210/452 |
| 2,687,997 | 8/1954 | Marchand | 210/455 |
| 3,151,071 | 9/1964 | Kasten | 210/232 |
| 3,246,920 | 4/1966 | Pall | 210/232 |
| 3,286,838 | 11/1966 | Jones | 210/232 |
| 3,502,220 | 3/1970 | Kohlberg | 210/452 |
| 3,503,511 | 3/1970 | Spitzberg | 210/232 |
| 3,767,054 | 10/1973 | Farrow | 210/232 |
| 4,077,884 | 3/1978 | Naumann | 210/455 |
| 4,116,845 | 9/1978 | Swank | 210/455 |
| 4,422,790 | 12/1983 | Gebert | 210/232 |

Primary Examiner—Ernest G. Therkorn
Attorney, Agent, or Firm—Lockwood, Alex, FitzGibbon & Cummings

[57] ABSTRACT

A refillable filter-drier assembly for use in a refrigerant line. The assembly includes a shell or casing which houses a replaceable core having a central bore and which may be a filter, drier or strainer element or any combination thereof. Refrigerant enters the shell adjacent one end and occupies the space surrounding the core. The liquid passes inwardly through the core into the central bore and exits the casing from the end opposite from which it enters. The core is supported in spaced relationship with respect to the casing interior by an annular cage on the outlet end of the core and by an end closure cage on its opposite end. Both the annular cage and the end closure cage have resilient fingers which grip the core adjacent its opposite ends. Both the annular cage and the end closure cage also have pluralities of laterally extending lugs which support the core in its spaced relationship within the casing.

6 Claims, 8 Drawing Figures

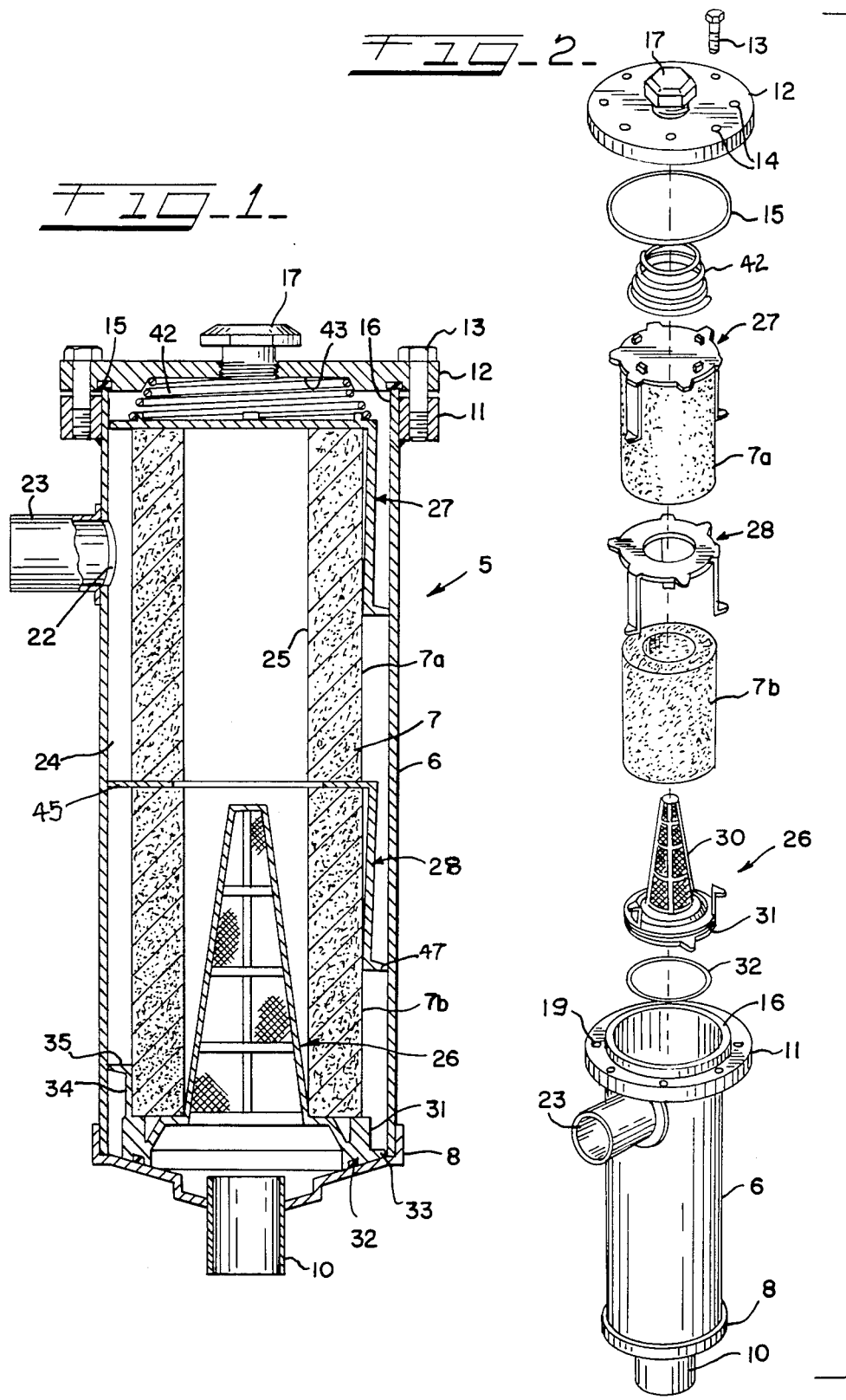

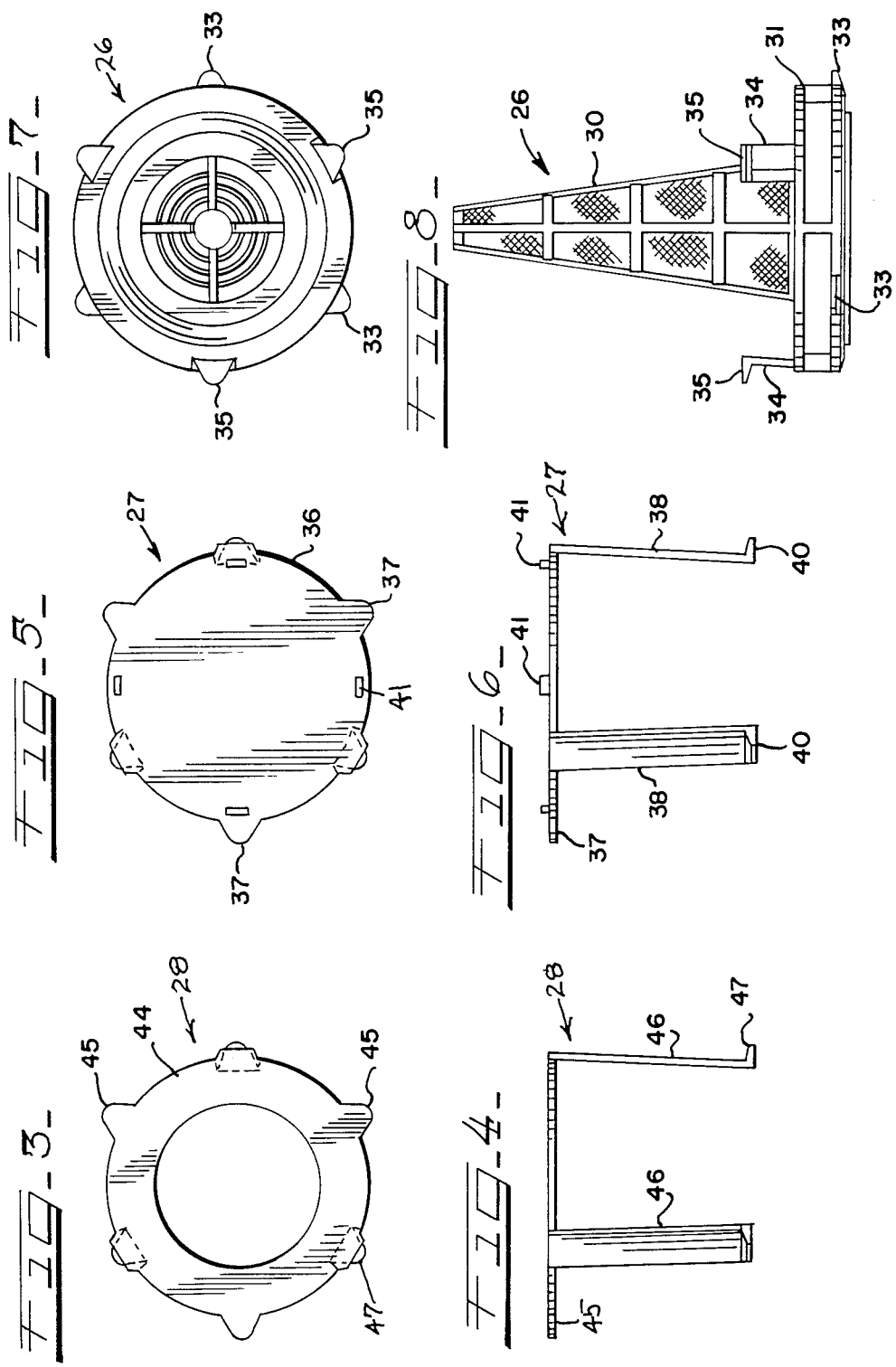

4,683,057

REFILLABLE FILTER-DRIER ASSEMBLY

This invention relates to innovations and improvements in refillable filter-drier assemblies for use in refrigerant lines. The assemblies include an outer casing or shell which houses a replaceable core element having a central bore and comprised of one or more sections. More particularly, the invention relates to innovations and improvements in refillable filter-drier assemblies of the type shown and disclosed in U.S. Pat. No. 3,286,838 dated Nov. 22, 1966.

The refillable filter-drier assemblies shown and disclosed in U.S. Pat. No. 3,286,838 have been commercially available from the Henry Valve Company, Melrose Park, Ill. and designated as its DRI-COR FILTER DRIER. In such commercially available assemblies, tension springs have been relied upon to hold cap plates that engage the opposite ends of the inner core in proper engagement and alignment. An important object of the present invention is to replace such tension springs and the cap plates associated therewith, as disclosed, for example, in U.S. Pat. No. 3,286,838, with improved fitments which are more easily installed and offer improved security as well as certain other advantages such as being economically formed of plastics.

The object of the invention, generally stated, is the provision of improved refillable filter-drier assemblies of the type shown and disclosed in U.S. Pat. No. 3,286,838 and which are refillable with cores that may be filter, drier or strainer elements, or any desired combination thereof.

BRIEF DESCRIPTION OF THE DRAWINGS

For a more complete understanding of the nature and scope of the invention and of the objects thereof and advantages provided thereby, reference may be had to the following detailed description of one presently preferred and illustrative embodiment of the invention taken in connection with the accompanying drawings, wherein:

FIG. 1 is a longitudinal section taken through a refillable filter-drier assembly forming one embodiment of the invention, certain parts being rotated about the longitudinal center line or principal axis of the unit for better illustration;

FIG. 2 is a perspective exploded view showing the components that comprise the assembly shown in FIG. 1;

FIG. 3 is a plan view of the annular intermediate cage or fitment used in the unit shown in FIGS. 1 and 2 between juxtaposed sections of the two-section replaceable core;

FIG. 4 is side elevational view of the annular intermediate cage or fitment shown in FIG. 3;

FIG. 5 is a plan view of the end closure cage or fitment used in the unit shown in FIGS. 1 and 2 to close off the end of the core opposite the end from which filtered, dried and/or strained refrigerant discharges;

FIG. 6 is a side elevational view of the end closure cage or fitment shown in FIG. 5;

FIG. 7 is a bottom plan view of the unitary annular end cage and screen which fits over and projects into the outlet end of the core in FIGS. 1 and 2; and FIG. 8 is a side elevational view of unitary annular end cage and screen shown in FIG. 7.

DESCRIPTION OF THE PREFERRED EMBODIMENTS

Referring to FIGS. 1 and 2 of the drawings, a refillable filter-drier assembly suitable for use in a refrigerant line is indicated generally at 5 which includes an outer cylindrical casing or shell 6 and a cylindrical replaceable core 7 which is in two sections, 7a and 7b. As well known in the art, the core 7 may be a filter, a drier or strainer or any combination thereof and such cores are readily available commercially. While the assembly 5 is shown vertically oriented in FIGS. 1 and 2 it will be understood that it is capable of being oriented in any desired direction depending upon the particular location in a system the assembly is located.

The casing or shell 6 is formed of a cylindrical sleeve with its lower end, as shown in FIG. 1, being provided with a cap 8 having welded thereto an outlet in the form of a nipple 10. The cap 8 may be removably screwed onto the casing sleeve 6 or permanently secured thereon by welding. Adjacent its opposite (i.e. upper) end, the shell or casing 6 has a flange ring 11 welded or otherwise secured thereto. A cover plate 12 is secured onto the upper end of the casing by means of a plurality of bolts 13—13 which pass through holes 14—14 therein and are screwed into tapped holes 19—19 in the flange ring 11. A circular gasket 15 is seated in an annular recess in the underside of the cover plate 12 so as to engage and seal against the exposed upper end 16 of the sleeve of casing 6.

The cover plate 12 is provided with a threaded center hole which is normally closed with a pipe plug 17.

The shell or casing 6 has an opening 22 in the sidewall adjacent the end opposite the outlet nipple 10 and to which is secured by welding or otherwise an inlet nipple 23.

The core 7 may be of known type having the ability to filter, dry and/or strain refrigerant or other fluid passing therethrough. The outer diameter of the core 7 is appreciably smaller than the interior diameter of the casing 6 so as to provide an annular space 24 therebetween which will be filled with the incoming refrigerant or other liquid. The core 7 and its component sections 7a and 7b has a central bore 25 which will in use be filled with the refrigerant or other liquid.

The present invention is particularly concerned with the means by which the core 7 and its component sections 7a and 7b are coaxially secured together end-to-end and supported within the shell or casing 6 so as to maintain the surrounding open annular space 24. For this purpose there is provided at the lower or outlet end of the core 7 an annular cage in the form of a combination annular end cap and screen indicated generally at 26 in FIG. 2. At the upper or opposite end of the core 7 there is provided an end closure cage or fitment indicated generally at 27 in FIG. 2. When the core 7 is comprised of two or more sections in end to end relationship, as represented by sections 7a and 7b, an intermediate annular cage or fitment is provided as indicated at 28 in FIG. 2.

The combination annular end cage and screen 26 may be integrally molded in one piece from a suitable plastic material or it may be in the form of a separate screen 30 which is joined at its base to the annular end cap 31. It will be seen from FIG. 1 that the diameter of the screen 30 at its base allows it to interfit in the lower end of the bore 25 while the screen itself projects upwardly a substantial distance therein. The bottom surface of the annular ring 31 is beveled so as to matingly engage the inclined inner surface of the cap 8 and provided with an annular recess in which is captured a ring gasket 32.

Referring to FIGS. 7 and 8 as well as FIGS. 1 and 2, it will be seen that the annular ring or cap section 31 is provided with three laterally projecting spacer lugs or ear 33—33 which are equally spaced 120° apart around the periphery. In addition, the cap section 31 is provided with three integral core gripping fingers 34—34 the distal ends of which terminate in laterally projecting or extending spacer lugs or ears 35—35. The fingers 34 are spaced 120° apart with each finger 34 being oriented mid-way between a pair of the lugs or ears 33. It will be noted from FIG. 8 that the core gripping fingers 34 are somewhat convergent or inclined inwardly toward the screen 30. Being somewhat resilient, the fingers 34 have gripping engagement with the exterior of the core section 7b adjacent its bottom end. From FIG. 1, it will be seen that the sets of laterally projecting lugs or ears 33—33 and 35—35 are engageable with the interior sidewall of the shell or casing 6 and thereby serve to support and space the lower end of the core 7 in proper coaxial relationship within the casing 6.

The end closure cage 27 includes a circular disc 36 (FIGS. 5 and 6) which fits over and closes off the upper end of the bore 25 of core 7 as shown in FIG. 1. The disc 36 has three equally spaced laterally projecting spacer lugs or ears 37—37 and three equally spaced axially extending core gripping fingers 38—38 which are oriented mid-way between the lugs 37. The distal ends of the core gripping fingers 38 are provided with laterally extending spacer lugs 40—40 which in conjunction with the laterally extending lugs 37 engage the interior sidewall of the shell or casing 6 and serve to coaxially support the upper end of the core 7 in proper relationship within the casing 6. The disc 36 is also provided with a plurality of upstanding spring-positioning lugs 41—41 arranged in circumferential relationship and over which the bottom end of a compression spring 42 (FIG. 1) fits. The upper end of the spring 42 is seated in a recess 43 in the cover plate 12.

The intermediate end cage 28 is formed of an annular or ring end section 44 (FIGS. 3 and 4) having equally spaced lugs or ears 45—45 projecting therefrom. Equally spaced intermediate the lugs or ears 45 the cage 28 has three axially extending core gripping fingers 46—46 which terminate at their distal ends in laterally extending spacer lugs or ears 47—47. It will be apparent that the lugs 45—45 and 47—47 cooperate to support and space the central portion of the core 7 in coaxial relationship within the outer shell or casing 6.

The refillable filter-drier assembly 5 will usually be pre-loaded with a new core 7 when first put into use and thereafter it will be refilled or reloaded from time to time after it has been in operation With the flow of refrigerant or other liquid to and from the assembly 5 cut-off, reloading is readily accomplished by first removing the cover plate 12 and then the fouled or depleted core 7. Starting with an empty casing 6, a fresh core section 7b with an annular end cage and screen 26 in place on one end thereof and an intermediate end cage 28 in place on the other end, is inserted into the shell or casing 6. Then a fresh core section 7b with an end closure cage 27 in place on the upper end is inserted and the compression spring 42 positioned over the upstanding locating lugs 41. Thereafter, the cover plate 12 is replaced and the screws 13—13 tightened so as to secure the cover plate in place with a liquid-tight seal at the gasket 15. The compression spring 42 will have sufficient force to provide a liquid-tight seal between the gasket 32 and the adjacent wall of the bottom cap 8 and will force the top end closure cage 27 into bore-closing engagement against the upper end of the section 7a. The unit is now ready for placement in service with the nipple 23 being connected to the line from which liquid refrigerant to be filtered, dried or strained is to be delivered while the nipple 10 is connected to the line into which the filtered, dried or strained refrigerant is to be discharged.

It will be apparent to those skilled in the art that a number of changes and modifications may be made in the particular structure of the refillable filter-drier assembly 5 shown and described in connection with FIGS. 1-8 without departing from the spirit and scope of the following claims. For example, the core 7 could be a single element or section instead of two core sections 7a and 7b. On the other hand, the core 7 can consist of three or more sections. The fitments or cages 26, 27 and 28 may be formed of metal instead of plastic. The casing 6 and core 7 may be multi-sided (e.g. octagonal) instead of being cylindrical and the cages 26, 27 and 28 correspondingly shaped. In addition to the intermediate cage 27, another intermediate cage can be applied onto the lower end of filter element 7a.

What is claimed is:

1. In a refillable filter-drier assembly for use in treating a refrigerant including an outer sleeve-like casing having end closures at least one of which is removable and one of said end closures having a liquid outlet nipple and said casing having a liquid inlet nipple adjacent the end thereof remote from the end having said liquid outlet nipple and, a replaceable core with a central bore comprised of at least one section and substantially coaxially disposed within said outer casing, said core being sufficiently smaller than the interior of said casing so as to provide an annular or sleeve-like liquid-receiving space therebetween, one end of said core being the end from which treated liquid discharges through said central bore and being axially supported adjacent said casing end closure having said outlet nipple and the opposite end of said core being axially supported adjacent the other of said end closures;

the combination with the foregoing of a first cage which fits over said one end of said core from which treated liquid discharges and which first cage carries a filter screen which projects into the central bore of said core, said first cage having a first plurality of core exterior gripping fingers and a first plurality of laterally extending spacer lugs serving to support the associated discharge end of said core coaxially disposed in said casing; and a second cage which fits over said opposite end of said core and has a disc which fits against said opposite end and closes the central bore therein and having a second plurality of core exterior gripping fingers projecting from said disc, said second cage having a second plurality of laterally extending spacer lugs serving to support the associated end of said core coaxially disposed in said outer casing.

2. In a refillable filter-drier assembly for use in treating a refrigerant including an outer sleeve-like casing having end closures at least one of which is removable and one of said end closures having a liquid outlet nipple and said casing having a liquid inlet nipple adjacent the end thereof remote from said liquid outlet nipple and, a replaceable core with a central bore comprised of at least one section and substantially coaxially disposed within said outer casing, said core being sufficiently smaller than the interior of said casing so as to provide an annular or sleeve-like liquid-receiving space therebetween, one end of said core being the end from which treated liquid discharges through said central bore and being axially supported adjacent said casing end closure having said outlet nipple and the opposite end of said core being axially supported adjacent the other of said end closures;

the combination with the foregoing of an annular end cage which fits over said one end of said core and which carries a filter screen which projects into the bore of said core, said annular end cage having a first plurality of laterally extending spacer lugs and a first plurality of core exterior gripping fingers projecting therefrom with the distal ends thereof having a second plurality of laterally extending spacer lugs, said first and second pluralities of spacer lugs serving to support the associated end of said core coaxially disposed in said outer casing; and an end closure cage fitting on said opposite end of said core and having a disc which fits against said opposite end of said core and closes the bore therein and having a second plurality of core exterior gripping fingers projecting from said disc, said disc having a third plurality of laterally extending spacer lugs and the distal ends of said second plurality of core exterior gripping fingers having a fourth plurality of of laterally extending spacer lugs, said third and fourth pluralities of lugs serving to support the associated end of said core coaxially disposed in said outer casing.

3. In the refillable filter-drier assembly of claim 2, said core being formed by a plurality of coaxially aligned sections abutting end-to-end, and an intermediate end cage fitting over the abutting end of one of said aligned sections and having an annular disc having a plurality of laterally extending lugs and a plurality of core exterior gripping fingers from the distal ends of which lugs project laterally.

4. In the refillable filter-drier assembly of claim 2, said sleeve-like casing and said core being cylindrical.

5. In the refillable filter-drier assembly of claim 2, said annular end cage and said end closure cage being formed of plastic with said first and second pluralities of core exterior gripping fingers being sufficiently convergent so as to grip said core exterior.

6. In the refillable filter-drier assembly of claim 2, said first and second pluralities of spacer lugs being radially offset, and said third and fourth pluralities of spacer lugs being radially offset.

* * * * *